June 23, 1953 — J. H. BERTIN ET AL — 2,642,895
AERODYNAMIC VALVE
Filed Feb. 16, 1948
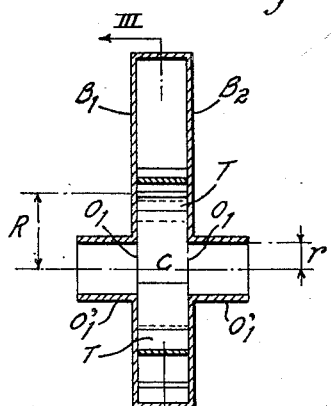
Fig.1  Fig.2
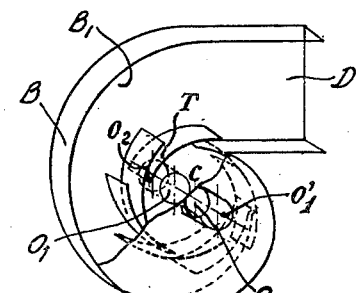
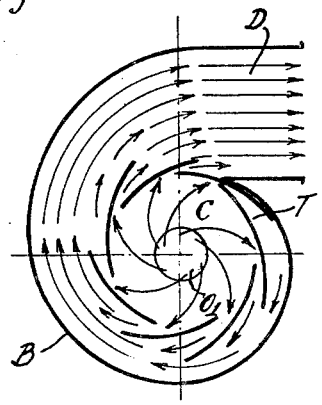
Fig.3  Fig.4
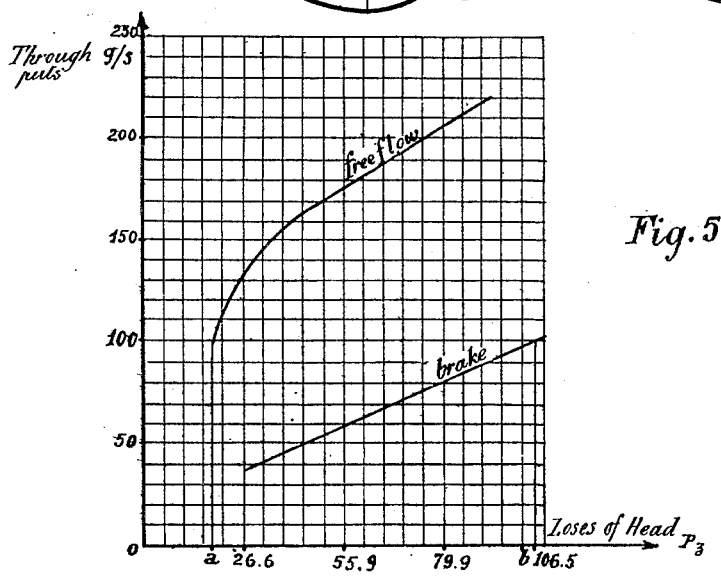
Fig.5
INVENTOR
J. H. Bertin + R. H. Marchal
By Watson, Cole, Grindle + Watson Patented June 23, 1953

2,642,895

UNITED STATES PATENT OFFICE 2,642,895

AERODYNAMIC VALVE

Jean H. Bertin and Raymond H. Marchal, Paris, France, assignors to Societe Nationale d'Etude et de Construction de Moteurs d'Aviation, Paris, France, a company of France Application February 16, 1948, Serial No. 8,625
In France September 5, 1946

Section 1, Public Law 690, August 8, 1946
Patent expires September 5, 1966

1 Claim. (Cl. 138—37)

Our invention relates to a device for controlling gaseous streams, said device being adapted to provide a great resistance for one direction of flow through the device and a low resistance for the opposite direction of flow, the ratio between the two resistances reaching a possible value of 10:1, said device including no movable mechanical member. It may therefore be designated as an aerodynamic valve.

The device according to the invention may be used to advantage each time periodical gaseous streams pass through pipes and its application is all the more advantageous when the frequency of the currents is higher because in this latter case the mechanical arrangements used to this day for the same purpose do not operate.

The device according to the invention allows furthering a predetermined direction of flow in any gaseous circuit where this may appear as useful. It is possible for instance to improve the scavenging of the cylinders of internal combustion engines and to prevent the return flow of the burnt gases exhausted from the cylinder. A device according to the invention located in a manner such that it shows the low resistance for the gases passing out of the cylinder outwardly opposes energetically their rearward flow. Generally speaking the present device is capable of being used in all thermic machines using a gas as an operative fluid e. g. in the case of piston engines operating with steam or gasoline, diesel engines, steam and gas turbines, compressors, reaction jet engines, compressed gas generators, and the like.

The device according to our invention is chiefly characterized by the fact that it includes a cylindrical capacity assuming a cylindrical or the like shape of revolution affording a passage for the gases and provided with means adapted to impress an important eddying motion to said gases for the direction of flow towards the axis of said chamber, while in the opposite direction of flow the progression of the gases is performed radially, with a full recovery of kinetic energy into potential energy.

Other features and advantages of our invention will appear in the reading of the following description, and in the inspection of the corresponding accompanying drawings illustrating diagrammaticaly and merely by way of example a form of execution of an apparatus according to our invention. In said drawings:

Figs. 1 and 2 are respectively an axial cross-section and a perspective view of the device, one of the side walls having been removed in Fig. 2.

Figs. 3 and 4 are cross-sections on a larger scale through line III—III of Fig. 1, Fig. 3 illustrating the circulation of the gases in the direction leading towards the axis, and Fig. 4 illustrating the circulation of the gases in the direction leading away from the axis.

Fig. 5 is a diagram wherein the outputs are given out as ordinates and the losses of head as abscisses.

The device illustrated in Figs. 1 and 2 includes chiefly a central cylindrical capacity $C$ whose radius is $R$. Said capacity, provided in a housing having a rounded wall $B$ of spiral shape and two side walls $B_1$ and $B_2$, one of which $B_2$ is removed in Fig. 2, has two series of ports:

(a). A pair of central ports or openings $O_1$ provided in the side walls $B_1$, $B_2$ of said housing coaxially with the axis of the cylindrical capacity $C$ and of radius $r$;

(b). A series of ports $O_2$ provided at the ends of nozzles $T$, the axes of which are located tangentially with reference to said capacity. Said nozzles $T$ are merely defined by curved partitions arranged between the side walls $B_1$, $B_2$ of the housing at right angles with respect to said walls. As shown in the drawing, said nozzles have a shape which is divergent for a gas flowing from axial ports $O_1$ to said nozzles through ports $O_1$.

The housing has further a duct $D$ arranged tangentially to said spiral wall $B$ in the same sense as the tangential nozzles $T$.

In the case where the resistance to flow is the greatest i. e. for a movement directed towards the axis as shown in Fig. 3, the gases enter the central capacity $C$ through the nozzles $T$ and peripheral ports $O_2$ and pass out through the axial ports $O_1$. They assume on entering by reason of the arrangement of the nozzles $T$ a considerable tangential speed.

According to the law of kinetic moments, since the product of the tangential speed of a gaseous particle and its distance to the axis of the capacity has a constant value, its tangential speed increases as its distance from the axis decreases. An actual expansion is thus impressed on the gas and this expansion is all the more important when the ratio of the input radius $R$ to the output radius $r$ is itself more considerable. The drop in pressure accompanying said expansion and that serves in the production of speed is a pure loss if the gases passing out of the apparatus through the axial ports $O_1$ are collected without transforming back into pressure the speed thus produced only producing heat by a degradation of energy. By way of example and in a nonlimiting manner, this loss may be obtained by evacuating the gases issuing from the axial ports $O_1$, by means of a couple of straight tubes $O_1'$, the diameter of which is equal to that of said axial ports which is $2r$ (Figs. 1 and 2).

In the other direction corresponding to movement away from the axis (Fig. 4) the gas admitted through the axial ports $O_1$ flows radially towards the peripheral ports $O_2$ and nozzles T. The expansion provided in this case is that which allows obtaining exclusively the speed required for ensuring the desired output flow through said ports and the nozzles T. It is much lower than that reached during the passage of a same output flow in the other direction.

Furthermore, the nozzles T located downstream with respect to the peripheral ports $O_2$ for this direction of flow allow thus a retransformation into pressure of a part of the speed assumed by the gaseous fluid as it passes through the peripheral ports $O_2$, so that the final loss of pressure is small. Finally the device forming the object of our invention causes very different losses of pressure according to the direction of flow; as stated this ratio may be great as 10:1 for certain types of apparatus according to our invention that have been tested experimentally.

The property disclosed is particularly apparent from inspection of Fig. 5 showing the curve of output flow as a function of the pressure losses respectively for both directions of flow.

It will be seen that these curves are very different from one another and make thus the asymmetry of the device stand out more clearly.

The device according to our invention forms thus a kind of valve operating merely aerodynamically. Such a valve is perhaps not as fluid tight as a mechanical valve but shows on the other hand important advantages over such mechanical valves in particular as follows:

(a) It operates without any movable mechanical part so that there are no shocks between a valve or the like member and its seat. No wear is possible and the only strain is a thermic strain in the case of the device being located in the circuit of the exhaust gases of an engine.

(b) Its inertia is that of the gaseous mass contained therein and is therefore a very reduced one. In particular, there cannot be any delay appearing between the movements of the fluid and those of the valve, as occurs frequently in mechanical systems.

(c) Lastly, and again by reason of the very low inertia of the mass of gas enclosed inside the device, the latter is extremely suitable for pulsating gaseous streams of high frequency.

Obviously, our invention is by no means limited to the forms of excution described and numerous modifications incorporating the same principle may be designed without unduly widening the scope of the present invention as defined in the accompanying claim.

What we claim is:

In a gaseous stream controlling device, the combination of a casing having a cross-sectional rounded spiral shaped outline, said casing being provided with a conduit tangentially connected to said outer rounded part and with two lateral plane side walls having axial openings and defining at the same time the side walls of said conduit, a revolution chamber inside said casing, arranged coaxially with respect to said casing and constituted by a set of nozzles having each with respect to said revolution chamber a tangential outlet having the same direction as that of said conduit with respect to said casing, said nozzles being divergent in the direction of gaseous flow from said axial openings towards said conduit whereby providing for increase in the pressure energy of gaseous flow in this direction, and duct means connected to the axial openings of said lateral side walls and projecting outside said casing coaxially with same.

JEAN H. BERTIN.
RAYMOND H. MARCHAL.

References Cited in the file of this patent

UNITED STATES PATENTS

| Number | Name | Date |
|---|---|---|
| 1,246,159 | Ricardo et al. | Nov. 13, 1917 |
| 1,315,232 | Moody | Sept. 9, 1919 |
| 1,671,719 | Hayes | May 29, 1928 |
| 1,839,616 | Thoma | Jan. 5, 1932 |
| 2,198,730 | Kadenacy | Apr. 30, 1940 |
| 2,206,193 | Kadenacy | July 2, 1940 |

FOREIGN PATENTS

| Number | Country | Date |
|---|---|---|
| 461,757 | Great Britain | Feb. 24, 1937 |
| 479,322 | Great Britain | Feb. 3, 1938 |